United States Patent [19]

Borlinghaus

[11] Patent Number: 4,778,162
[45] Date of Patent: Oct. 18, 1988

[54] DEVICE FOR CONNECTING A HELICAL COMPRESSION SPRING TO THE TRAILING ARM IN THE WHEEL SUSPENSION OF A MOTOR VEHICLE

[75] Inventor: Arthur Borlinghaus, Gummersbach, Fed. Rep. of Germany

[73] Assignee: Firma Gebruder Ahle GmbH & Co, Lindlar, Fed. Rep. of Germany

[21] Appl. No.: 920,478

[22] Filed: Oct. 17, 1986

[30] Foreign Application Priority Data

Sep. 13, 1983 [DE] Fed. Rep. of Germany ....... 3333002
Apr. 7, 1984 [DE] Fed. Rep. of Germany ....... 3413265

[51] Int. Cl.[4] ................ B60G 11/14; B60G 11/52; F16F 1/06
[52] U.S. Cl. .................................. 267/248; 267/33; 267/173; 267/288
[58] Field of Search .................. 267/15 R, 16, 17 R, 267/20 R, 20 A, 28, 33, 60, 61 R, 615, 167, 170, 173, 178, 179, 182, 228, 248, 251, 286, 288, 166, 166.1, 180; 280/725, 697, 668; 384/2

[56] References Cited

U.S. PATENT DOCUMENTS

| 917,001 | 4/1909 | Chase | 267/179 X |
| 1,133,973 | 3/1915 | Koch | 267/179 X |
| 1,409,600 | 3/1922 | Smith | 267/20 R |
| 2,193,567 | 3/1940 | Pointer | 267/20 R X |

FOREIGN PATENT DOCUMENTS

| 0226362 | 8/1958 | Australia | 267/20 R |
| 1176666 | 10/1984 | Canada | 267/33 |
| 1128126 | 4/1956 | France | 384/2 |
| 0584140 | 12/1977 | U.S.S.R. | 267/33 |

Primary Examiner—Andres Kashnikow
Assistant Examiner—Robert J. Oberleitner
Attorney, Agent, or Firm—Sprung Horn Kramer & Woods

[57] ABSTRACT

A device for connecting a helical compression spring to the trailing arm in the wheel suspension of a motor vehicle. Bending stresses on the spring are prevented by supporting it on the trailing arm through a support that is mounted in a bushing rigidly attached to the trailing arm in such a way that the support moves freely around predetermined angle to the normal to the plane of support on the trailing arm. In one embodiment that is especially simple in design the wire at the end of the spring that faces the trailing arm spirals in as far as the center line of the spring, the end of the spring wire is bent at a right angle and extended axially out of the spring, and the end of the spring wire functions in itself as a support, the face of the end of the wire resting on a ball positioned in a bushing.

8 Claims, 9 Drawing Sheets

Fig.9

DEVICE FOR CONNECTING A HELICAL COMPRESSION SPRING TO THE TRAILING ARM IN THE WHEEL SUSPENSION OF A MOTOR VEHICLE

This is a continuation-in-part application of Ser. No. 650,322, filed Sept. 12, 1985, and now abandoned.

BACKGROUND OF THE INVENTION

The object of the invention is a device for connecting a helical compression spring to the trailing arm in the wheel suspension of a motor vehicle.

DISCUSSION OF THE PRIOR ART

Wheel suspensions for motor vehicles in which one end of a helical compression spring, a cylindrical spring for example, is supported on the chassis while the other end rests against the trailing arm are known. This type of wheel suspension has a number of drawbacks, and, the shorter the trailing arm, the shorter the distance between the point of rotation of the trailing arm and the point at which the spring contacts it, that is, the greater are the drawbacks. Since there is a trend in contemporary automotive design to use short trailing arms, the angle between the trailing arms and the surface that the spring rests on can be considerable, which reinforce these drawbacks even more. As will be explained hereinafter with reference to the attached drawings, the helical compression spring in known wheel suspensions, and especially the terminal coil that rests against the trailing arm, is subject to additional bending stress, which reduces the life of the mechanism or, if this stress is decreased by dimensioning the parts appropriately, increases the weight of the spring. The additional bending stress increases with the angle included between the trailing arm and the surface where the spring rests against the chassis whether the spring is loaded or unloaded.

The design also causes the end of the spring that rests against trailing arm to lift off of the side of the trailing arm facing away from the point of rotation of the trailing arm when the spring is unloaded, making the seating of the spring on the trailing arm unsatisfactory.

Since the center of force in helical compression springs is generally eccentric and also changes under load, the situation just described can lead to changes in the resulting spring characteristic, with the result that the transmission ratio between the spring and the wheel and hence the resiliency at the wheel can vary additionally and in unpredictable ways depending on the amount of load and on the degree of relaxation.

Finally, the known devices also entail the risk of eliminating the surface protection of the terminal coil of the spring that rests against the tie rod as the result of the coil rubbing against the trailing arm. The end of the spring will then corrode and can break prematurely. A backing of zinc can delay but not completely eliminate this process.

It is an object of the present invention to provide a device of the aforesaid type that prevents additional bending stresses on the helical compression spring.

SUMMARY OF THE INVENTION

This object is attained in accordance with the invention in an improvement wherein the helical compression spring consists of spring wire and is supported on the trailing arm on a bearing that is designed such that the helical compression spring can move freely within a bearing bush secured to the trailing arm through a predetermined angle to the normal to the plane E of support, which is essentially parallel to the surface of the trailing arm and is located at the center of the trailing arm, and wherein some of the spring wire at the end of the helical compression spring that faces the trailing arm spirals in with one end bent at the right angle, extending axially out of the helical compression spring and supported on a support with a spherical supporting surface in the bearing bush, which is in the form of a bushing, whereby the points of support for the spherical supporting surface are located within or below (not above) the plane of support.

A wide range of practical embodiments of the device in accordance with the invention are possible and will be described hereinafter in detail with reference to the drawings.

The principle behind the invention is the introduction between the helical compression spring and the trailing arm of a component that consists of or behaves basically like an articulated joint. This completely prevents the helical compression spring from bending, aside from unavoidable friction resistance in the joint and its associated component.

Preventing additional bending stresses in the helical compression spring allows it to be torsionally strained to a greater extent, which saves on a considerably volume of material.

Helical compression springs with one end of the wire extended axially out of the end are in themselves known. U.S. Pat. No. 1,423,894 describes attaching a bumper ("fender" in British usage) to the chassis of a motor vehicle by means of this type of spring. This known spring, however, is designed along these lines strictly for engineering reasons involving the method of attachment. It is not employed in a device for connecting a helical compression spring to the trailing arm in the wheel suspension of a motor vehicle and the object of the present invention is neither addressed nor attained.

The object in accordance with the invention is attained in an especially practical way by means of the special application of a helical compression spring with one end of the spring wire extending axially out of the end of the helical compression spring, whereby distortion of the spring characteristic due to displacement of the center of force is also avoided, said center of force accordingly being constant, and whereby the end of the helical compression spring toward the trailing arm has no dead terminal coil. The advantage of the latter is that considerably material is saved and no additional measures are necessary to counteract damage to the surface protection.

Furthermore, positioning the points of support for the spherical supporting surface within or below the plane of support prevents additional moments from occurring longitudinally and transversely in relation to the trailing arm during the stroke.

Naturally, the end of the spring wire can also be extended axially out of the end of the helical compression spring that faces the chassis of the vehicle. A design of this type without spring plates saves even more, as much as 30%, material.

The articulated joint interposed between the helical compression spring and the trailing arm in accordance with the basic object of the invention can be designed with a socket that is open at the top or a similar type of bushing mounted on the trailing arm for the support to rest on.

Other embodiments, in which the articulated connection between the helical compression spring and the trailing arm is designed with the socket mounted on the bottom surface of the support, the bottom surface facing the trailing arm, are, however, also possible.

An additional advantage of these embodiments is that no contaminants can get into the bushing from above and increase the wear.

BRIEF DESCRIPTION OF THE DRAWINGS

Some preferred embodiments of the invention will now be described with reference to the attached drawings, wherein.

DESCRIPTION OF THE SPECIFIC EMBODIMENTS

The problem to be solved by the invention will first be described once again with reference to FIG. 1.

Figure 1:
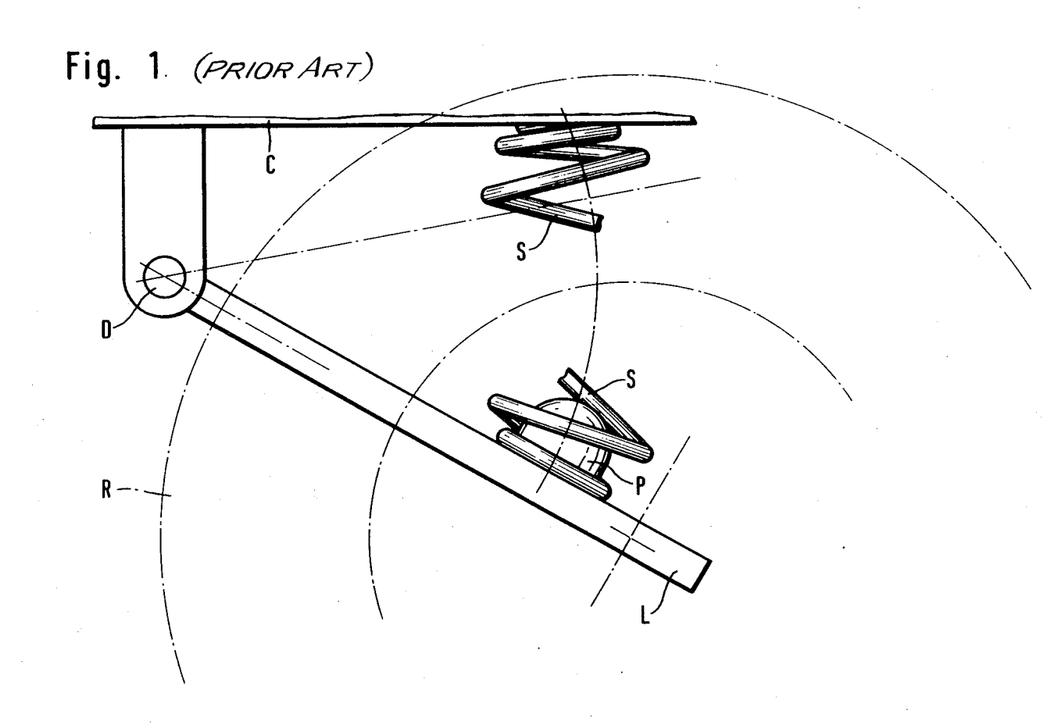
FIG. 1 illustrates a wheel suspension for motor vehicles in accordance with the state of the art that serves as a point of departure for the invention.

FIG. 1 is a schematic representation of a wheel suspension for motor vehicles of the conventional type. A trailing arm L that pivots around an axis D of rotation is mounted on the chassis C of a motor vehicle. Between the top of trailing arm L and the bottom of chassis C is a helical compression spring S that is rigidly fastened to both chassis C and trailing arm L. A wheel R is also connected to trailing arm L in a way that is not illustrated. A rubber cushion P mounted on trailing arm L and inside helical compression spring S intercepts especially hard shocks that would tend to block the spring.

The angle between trailing arm L and chassis C leads to considerably bending stresses on helical compression spring S and, the shorter the trailing arm and hence the greater the changes in the angle, the greater the bending stresses.

These additional bending stresses are eliminated in the embodiments of the device in accordance with the invention that will now be described.

FIGS. 2 through 9 illustrate devices for connecting a helical compression spring to the trailing arm in the wheel suspension of a motor vehicle. Each figure shows only the end of the spring that is connected to the trailing arm.

Figure 2:
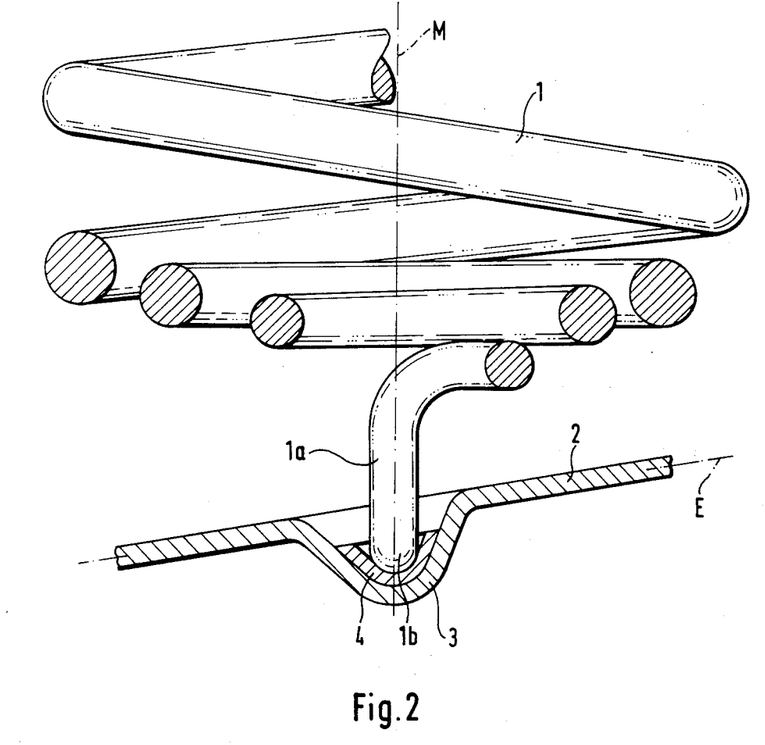
FIG. 2 is a partial section through one embodiment of the device for connecting a helical compression spring to the trailing arm in the wheel suspension of a motor vehicle in accordance with the invention with the end of the spring wire extending axially out of the end of the spring.
Figure 3:
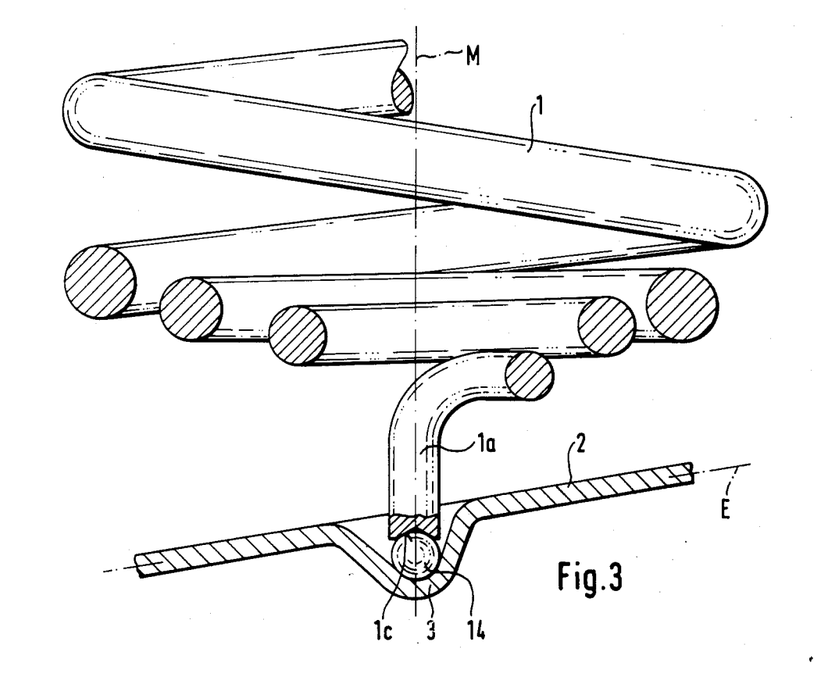
FIG. 3 illustrates a variant of the embodiment in FIG. 2.
Figure 3A:
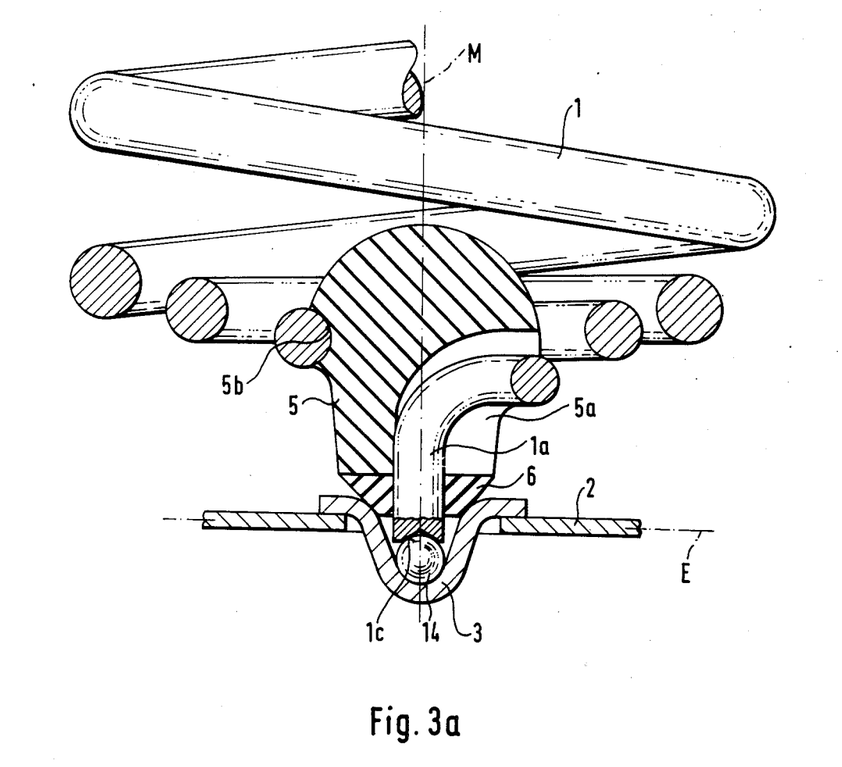
FIG. 3a illustrates a variant of the embodiment illustrated in FIG. 3.
Figure 4:
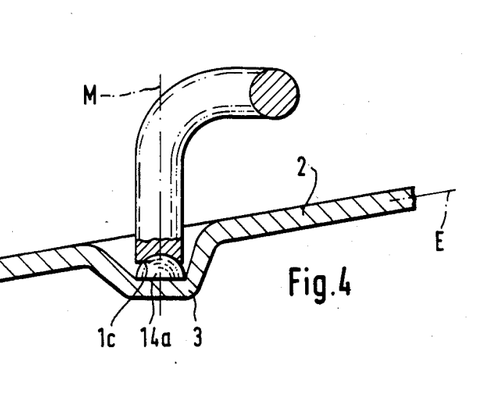
FIG. 4 illustrates another variant of the embodiment in FIG. 2.

FIGS. 2 through 4 illustrate embodiments that are especially practical and simple in design.

As will be evident from FIG. 2, the end of a helical compression spring 1 that faces the trailing arm spirals in as far as its center line M of the spring. The end 1a of the spring wire is bent at a right angle and extended along the center line M axially out of helical compression spring 1.

At its outermost end 1a spring wire 11 has a hemisphere 1b that is in one piece with it. The end 1a of the spring wire that extends out of helical compression spring 1 extends into bushing 3 and rests on the convex spherical surface of hemisphere 1b on the matching concave spherical surface of an insert 4 of hard material. With reference now to FIG. 2, the points of contact between the surface of hemisphere 1b and the surface of insert 4 are below a plane E, called a plane of support in what follows, that extends essentially parallel to the surface of trailing arm 2 and is located at the center of the arm. This prevents additional moments from occurring longitudinally and transversely in relation to trailing arm 2 simultaneously with a relative motion between trailing arm 2 and helical compression spring 1. The bushing 3 in the embodiment illustrated in FIG. 2 is integrated into trailing arm 2. It is of course also possible to position a bushing in an opening on the trailing arm.

The bushing 3 in the slightly different embodiment illustrated in FIG. 3 has a supporting insert in the form of a steel ball 14. The end 1a of the spring wire rests on the steel ball, and the mechanism is centered by a conical depression 1c in the face of end 1a.

Part of a sphere, a hemisphere 14a for example, can of course also be employed as a supporting insert, with its convex surface facing up as illustrated in FIG. 4. In this case the interior of the bushing will be shaped to provide a secure seating for hemisphere 14a.

FIG. 3a illustrates a variant of the embodiment illustrated in FIG. 3. The end of helical compression spring 1 that faces trailing arm 2 extends through a rubber cushion 5, entering the side of the cushion and exiting the cushion axially. The right-angled section of end of the spring wire is inside the cushion. The cushion has for this purpose a lateral slot 5a so that it can easily be snapped into the lower end of the spring with part of the spring's terminal coil surrounding an appropriate depression 5b in the cushion.

The function of cushion 5 is to accommodate especially powerful impacts, and it is designed and positioned to prevent detriment to the joint-like connection between helical compression spring 1 and trailing arm 2.

A rubber sealing ring 6 that completely surrounds end 1a of the spring wire is also interposed between cushion 5 and bushing 3 to seal off the top of the open bushing. The side of sealing ring 6 that faces bushing 3 is conical, and the resulting surface rests on the upper edge of the bushing and seals it off against contamination. Cushion 5 rests on the top of sealing ring 6 and secures it in position.

The embodiments illustrated in FIGS. 3, 3a and 4 are also designed so that the points of support for the spherical surfaces are below the aforesaid plane E of support.

The mode of support of end 1a of the spring wire in bushing 3 in all the embodiments specified with reference to FIGS. 2 through 4, whether by means of the hemisphere 1b in one piece with end 1a or by means of the steel ball 14 or the hemisphere 14a, functions like a joint, and the end of helical compression spring 1 that faces trailing arm 2 is mounted in bushing 3 in each case such that it can swing freely around a prescribed angle to the normal to plane E of support.

Figure 5:
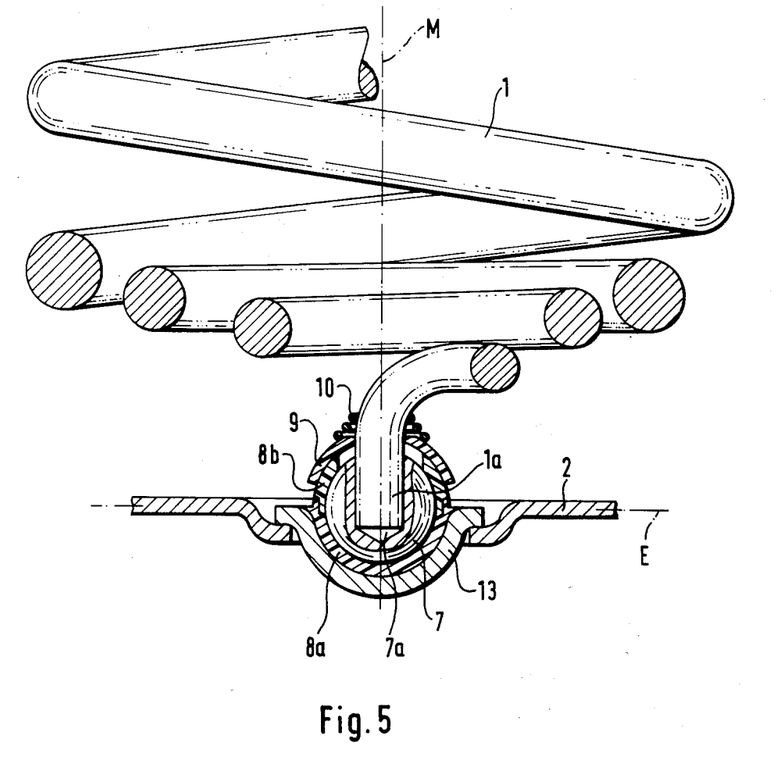
FIG. 5 illustrates another embodiment of the device in accordance with the invention with the end of the spring wire extending axially out of the end of the spring.
Figure 6:
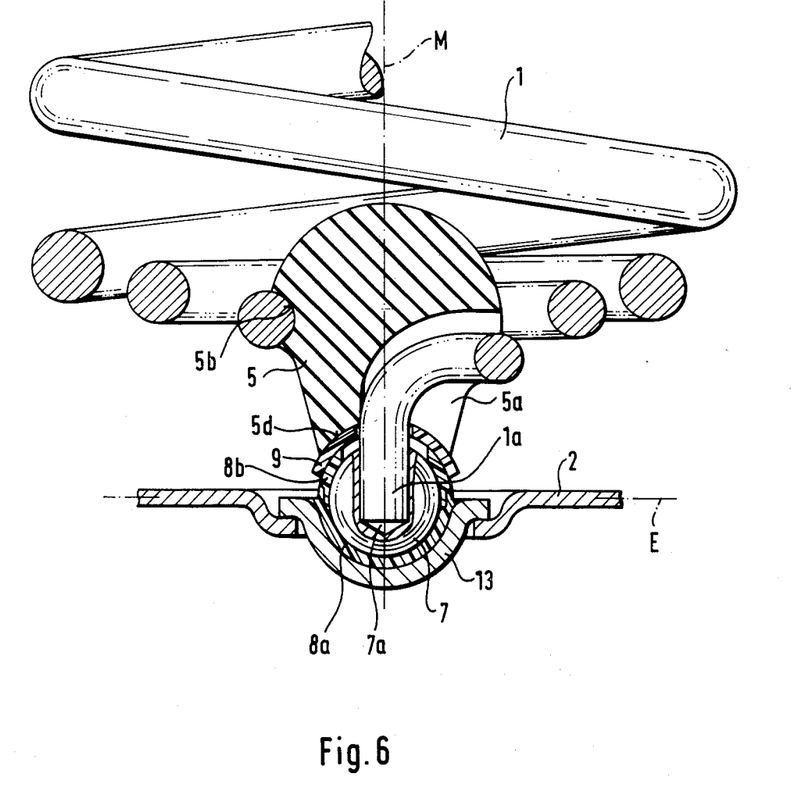
FIG. 6 illustrates a variant of the embodiment in FIG. 5.

The design of the articulated connection between helical compression spring 1 and trailing arm 2 in the embodiment illustrated in FIGS. 5 and 6 is somewhat different. Similar parts are again labeled with the same reference numbers in this case.

The wire in helical compression spring 1 spirals in as far as its center line M, where it is bent at a right angle, with its end 1a extended axially out of the spring. End 1a does not function itself as a support in this embodiment, in which helical compression spring 1 is connected to trailing arm 2 through a ball-and-socket joint. End 1a of the spring wire is inserted in a bore 7a in a steel ball 7, in which it can also be secured with adhesive. A socket 13, which can be made out of steel, is inserted in an aperture in trailing arm 2. Socket 13 has a lining consisting of two bushings 8a and 8b, which can be made out of plastic. Lower bushing 8a is inserted in socket 13 and upper bushing 8b rests on the lower bushing in such a way that steel ball 7 rests in a lining constituted by bushings 8a and 8b. End 1a of the spring wire extends through an aperture in the top of upper bushing 8b. The top of upper bushing 8b is also covered with a plastic protective cap 9 attached to end 1a of the spring wire and subject to a small truncoconical spring 10 that surrounds end 1a.

The end of helical compression spring 1 that faces trailing arm 2 also moves freely in this embodiment as well.

The variant of the embodiment in FIG. 5 that is illustrated in FIG. 6 has a rubber cushion 5 at the bottom end of helical compression spring 1 as described with reference to FIG. 3a. Cushion 5 rests on its concave bottom surface 5d against protective cap 9. The forces that act on the cushion 5 in this embodiment are also intercepted by a ball-and-socket joint.

Another advantage of the embodiments illustrated in FIGS. 5 and 6 is that helical compression spring 1 can be supplied and installed with the support unit—steel ball 7, bushings 8a and 8b, protective cap 9, and truncoconical spring 10 that is—already mounted on it as a finished and coherent subassembly. It is only necessary then to insert socket 13 into trailing arm 2, although the socket can also be already integrated into the trailing arm.

Figure 7:
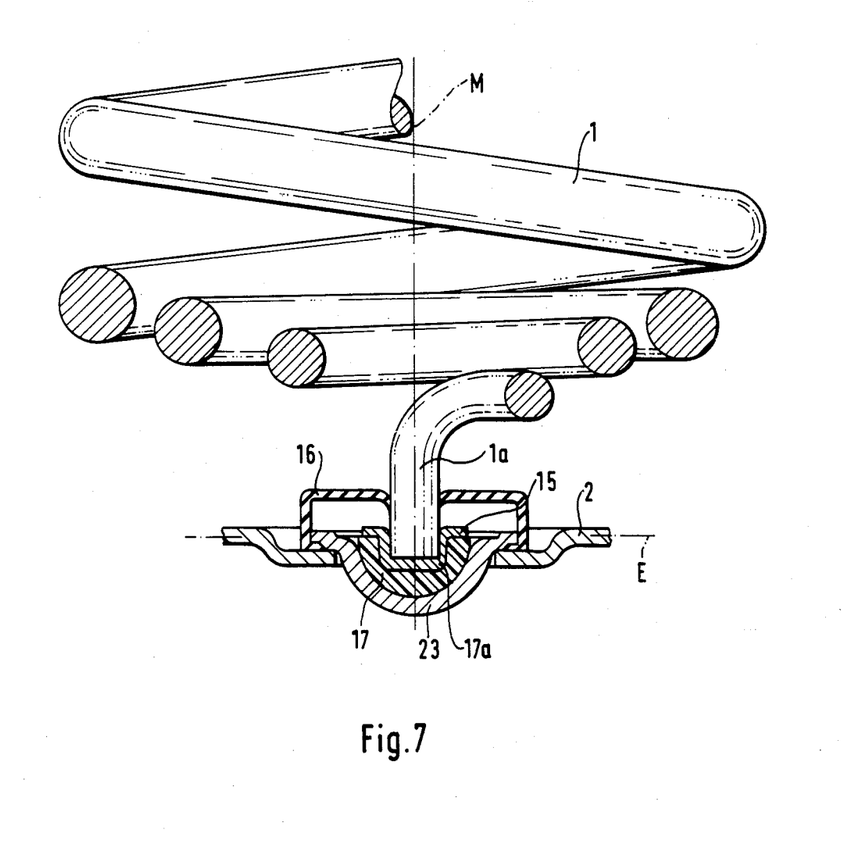
FIG. 7 illustrates a third embodiment of the device in accordance with the invention with the end of the spring wire extended axially out of the end of the spring.
Figure 8:
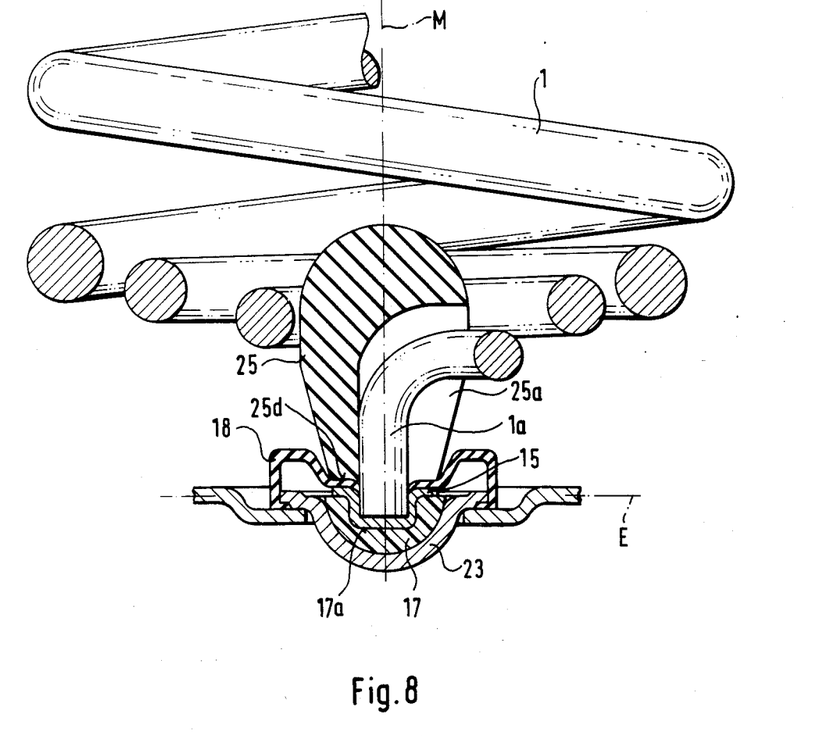
FIG. 8 illustrates a variant of the embodiment in FIG. 7.

The helical compression spring 1 in the embodiment illustrated in FIGS. 7 and 8 is also connected to trailing arm 2 with a ball-and-socket joint. The design of the joint differs somewhat from that illustrated in FIGS. 5 and 6. End 1a of the spring wire is extended axially out of helical compression spring 1 and is inserted in a pressure distributor 15, which can be made out of steel, in a depression 17a in a plastic hemisphere 17. Hemisphere 17 rests in a steel socket 23 in trailing arm 2. The top of the ball-and-socket joint is covered with a cap-shaped cover 16 made out of rubber for example and end 1a extends through cover 16. This embodiment can also have a cushion 25, as illustrated in FIG. 8, that rests on its bottom surface 25d on a covering cap 18, which is designed somewhat differently in this embodiment. Cushion 25 is snapped into the end of helical compression spring 1 at a lateral slot 25a.

The bottom edges of cap-shaped cover 16 or 18 are, as will be evident from FIGS. 7 and 8, bent in and clamped between the surface of trailing arm 2 and the edge of socket 23, which is inserted in an aperture in the trailing arm. Thus, the cover is secured in such a way as to provide a tight seal. Another advantage of this design is that helical compression spring 1 is surrounded along with the overall ball-and-socket joint, which consists of hemisphere 17 and socket 23, by cap-shaped cover 16 or 18 and can, if need be, be supplied as a finished subassembly along with rubber cushion 25 and inserted directly into trailing arm 2. It is practical in this case for end 1a of the spring wire to be secured in pressure distributor 15, with an adhesive for example.

Figure 9:
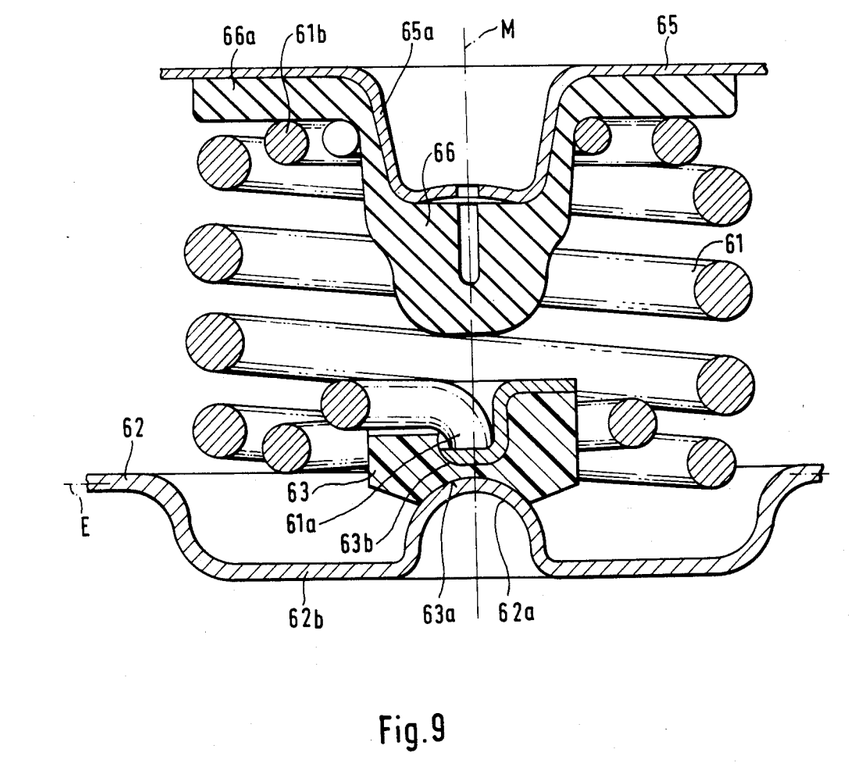
FIG. 9 illustrates a partial section through an embodiment of the device for connecting a helical compression spring to the trailing arm in the wheel suspension of a motor vehicle in accordance with the invention with the end of the spring wire extended axially out of the end of the spring and with a socket on the support.

FIG. 9 illustrates an embodiment intended for connecting a helical compression spring to the trailing arm in the wheel suspension of a motor vehicle that is designed somewhat differently from the embodiments illustrated in FIGS. 2 through 8 although based on the same principle.

A helical compression spring 61 is positioned between the chassis 65 of a motor vehicle that is not otherwise illustrated and the incompletely illustrated trailing arm 62 of its wheel suspension. The upper end 61b of helical compression spring 61 is attached to chassis 65 and the bottom end, the end 61a facing trailing arm 62, spirals in as far as the center line M of the spring. End 61a of the spring wire is bent at a right angle and is extended axially to the spring and inserted in a bore 63b in a plastic support 63. The pressure distribution into the bore 63b in support 63 is improved by means of a steel pressure-distribution bushing 64. End 61a of the spring wire can be secured in pressure-distribution bushing 64 with adhesive.

There is a spherical surface 63a on the lower side of support 63, the side, that is, that faces trailing arm 62. Support 63 rests on spherical surface 63a on the convex spherical surface of a bearing element 62a. Bearing element 62a is positioned in a depression 62b in trailing arm 62 in such a way that, as in the embodiments previously specified herein, the points of support for the spherical surfaces on support 63 and on bearing element 62a is rigidly fastened to trailing arm 62. The bearing component 63a in the illustrated embodiment is in the form of a blister in bearing element 62a forced into trailing arm 62. Bearing element 62a can of course also be a solid component inserted into the depression 62b in trailing arm 62.

The center of force of the helical compression spring 61 illustrated in FIG. 9 is always on the center line of the spring, which has no dead coil at the end toward trailing arm 62, saving considerably on material.

One great advantage of the embodiment illustrated in FIG. 9 is that, on the one hand, there is less specific pressure in the bushing even when the end of the spring wire is extended axially out of the spring because the diameter of the ball or ball socket can be longer than that of the wire. It is also possible, on the other hand, for the device to have a low overall height because, as will be evident from FIG. 9, support 63 can be kept relatively short and its radius can be kept shorter than the minimal effective coil radius of the spring. As will also be evident from FIG. 9, no additional space will be needed to attach the spring to the tie rod because, as load increases, the outer coils of the spring will be forced down to the level of plane E of support or even lower.

The helical compression spring 61 illustrated in FIG. 9 is a double truncoconical spring with a cylindrical midsection. The device can of course be employed with other types of spring.

A rubber cushion 66 mounted at the upper end of helical compression spring 61 toward chassis 65 on a bulge 65a in chassis 65 intercepts especially powerful shocks. The edge 66a of rubber cushion 66 simultaneously functions as a resilient support for the terminal coils 61b at the top of helical compression spring 61 when they successively come to rest one inside another and generate a progressive characteristic as the load increases.

The rubber cushion 66 in the embodiment illustrated in FIG. 9 can accordingly be conventionally fastened to an upper spring plate in contrast to the embodiments previously described herein with axially extended spring-wire ends. The surface of support 63 simultaneously provides a practical seating for rubber cushion 66.

End 61a of the spring wire is articulated through bushing 63a to bearing element 62a and helical compression spring 61 can move freely at the end facing trailing arm 62 around a certain angle to the normal to the plane E of support on the trailing arm.

The helical compression spring 61 in FIG. 9 can of course also have a linear characteristic. In this case, the spring plate at the upper end of the spring, the end facing the chassis, has a smaller diameter and the terminal coils of the spring does not come to rest against it.

What is claimed is:

1. In a device for connecting a helical compression spring to a trailing arm in a wheel suspension of a motor vehicle, the improvement wherein the helical compression spring consists of spring wire and is supported on the trailing arm on a bearing including a bearing bush secured to the trailing arm, wherein the helical compression spring can move freely within the bearing bush through a predetermined angle to the normal of a plane of support, which is essentially parallel to the surface of the trailing arm and is located at the center of the trailing arm, and wherein a portion of the spring wire at the end of the helical compression spring that faces the trailing arm spirals inwardly with one end bent at a right angle, extending axially out of the helical compression spring and terminates in a face having a supporting surface which is one of concave and convex, and means forming a mating surface that matches the shape of the supporting surface and on which the supporting surface directly rests, wherein the supporting surface is separate from and freely movable relative to the mating surface and wherein the mating surface is located in the bearing bush such that the points of support for the supporting surface are not above the plane of support.

2. A device according to claim 1, wherein the supporting surface comprises a convex surface of a hemisphere shaped onto and in one piece with the axially extended end of the spring wire and the mating surface is a concave inner surface of the bearing bush.

3. A device according to claim 1, wherein the means forming the mating surface comprises an insert position in the bearing bush with an upward-facing convex surface of hard material and the supporting surface comprises the concave surface of a conical depression.

4. A device according to claim 3, wherein the supporting insert is a complete sphere.

5. A device according to claim 3, wherein the supporting insert is a hemisphere.

6. A device according to claim 1, further comprising a cushion member through which the extended end of the spring wire projects through, and wherein the section of the spring wire that is bent at a right angle enters at one side of the cushion member and the bent end of the spring wire emerges from the cushion member axially.

7. A device according to claim 6, wherein the cushion member is mechanically secured within at least part of one coil of the helical compression spring.

8. A device according to claim 6, further comprising a sealing ring that surrounds the end of the spring wire that extends out of the helical compression spring and seals off the top of the bearing bush and is positioned between the cushion member and the bearing bush.

* * * * *

UNITED STATES PATENT AND TRADEMARK OFFICE
CERTIFICATE OF CORRECTION

PATENT NO. : 4,778,162
DATED : October 18, 1988
INVENTOR(S) : Arthur Borlinghaus It is certified that error appears in the above-identified patent and that said Letters Patent is hereby corrected as shown below:

Col. 4, line 19          After "end la" insert --the--

Col. 4, line 19          After "wire" delete "11"

Signed and Sealed this

Twenty-second Day of August, 1989

Attest:

DONALD J. QUIGG

Attesting Officer

Commissioner of Patents and Trademarks